Figure 1:
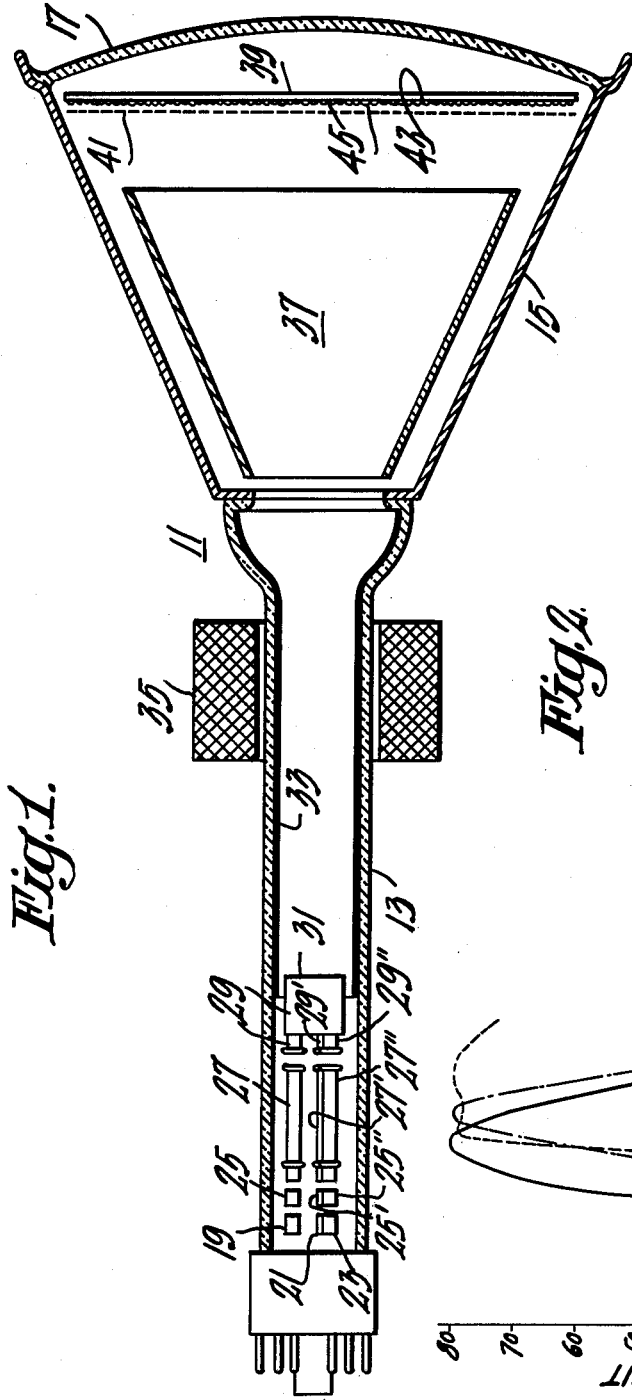

Jan. 31, 1956　　　A. L. J. SMITH　　　2,733,164

MULTI-COLOR KINESCOPE SCREEN

Filed June 2, 1952

INVENTOR
Arthur L. J. Smith
BY
W. S. Hill
AGENT

United States Patent Office 2,733,164
Patented Jan. 31, 1956

2,733,164
MULTI-COLOR KINESCOPE SCREEN

Arthur L. J. Smith, Lancaster, Pa., assignor to Radio Corporation of America, a corporation of Delaware Application June 2, 1952, Serial No. 291,212

12 Claims. (Cl. 117—33.5)

This invention relates to kinescopes of the type used for reproducing images in a plurality of colors. It relates particularly to improvements in the phosphor viewing screens of such kinescopes.

Color kinescopes are described in an article entitled "General description of receivers for tri-color kinescopes" in the June 1950, edition of the RCA Review. They are described in greater detail in the following copending applications for U. S. patents: Serial No. 548,239, August 5, 1944, of Alfred N. Goldsmith which was refiled on July 19, 1947, as Serial No. 762,175; Serial No. 140,769, January 27, 1950, A. C. Schroeder; Serial No. 166,416, June 6, 1950, H. C. Moodey; Serial No. 143,405, February 10, 1950, Russell R. Law.

The color kinescopes described in the above identified article are of the "masked target" variety. They comprise an evacuated envelope containing a viewing screen which comprises a glass plate having on its surface an orderly array of minute, closely-spaced phosphor dots arranged in triads. Each triad comprises a green-emitting dot, a red-emitting dot, and a blue-emitting dot. This phosphor array is bombarded by one or more electron beams approaching the target from three different directions, the beam from each of these directions being modulated by different color information. It will be understood that either a single electron beam, deflected so as to strike the target from three different directions, can be used or three separate beams. A "shadow mask" in the path of the electron beams toward the phosphor screen has a multiplicity of apertures so arranged as to shield the red-modulated beam from striking the blue or the green phosphor dots, the blue beam from striking the red and green dots, and the green beam from striking the red and blue dots. The red, the green and the blue dot of each triad combine to constitute a visual element. The visual elements combine to produce reproductions in color of the scene being televised.

Previously, the phosphor materials most frequently used in these target assemblies have consisted of: calcium magnesium silicate (titanium activated), for the blue component; zinc orthosilicate (manganese activated), for the green component; and, cadmium borate for the red component.

Despite its many advantages, this combination leaves something to be desired. One difficulty with the previous phosphor combination is that the cadmium borate, although its peak light emission is in the red region of the spectrum, has such a broad band that it becomes necessary to provide a red didymium filter across the face of the tube to obtain a satisfactory red tone. This filter cuts down the overall light output from all three color components by approximately 25 per cent. If increased beam current is resorted to in order to raise the light output, the problem of color dilution is encountered because the thin metal of the shadow mask tends to become warped.

Still another difficulty with the previous combination is that cadmium borate phosphor has a tendency to current saturation within the range of normal operating voltages so that, beyond a given point, increase in beam intensity gives no corresponding increase in red light.

The cadium borate also makes processing of the tube difficult, because it tends to decompose and deposit free cadmium throughout the tube, contaminating the other working parts. On the other hand, the zinc phosphate phosphors used in the screens of the present invitation in place of the cadmium borate phosphors are highly stable when subjected to the usual tube processing techniques. These phosphors are particularly resistant to heat which causes some other good red-emitting phosphors to decompose.

Accordingly, it is an object of the present invention to provide an improved phosphor combination for use in the viewing screen of multi-color kinescopes.

Another object is to provide, for a multi-color kinescope, a phosphor viewing screen which will not require an optical filter.

Another object is to provide, for a multi-color kinescope, a viewing screen of which the phosphor components are less subject to chemical decomposition than those of the prior art.

Another object is to provide, in a multi-color kinescope, a phosphor viewing screen which is not subject to saturation within normal kinescope operating voltages.

Another object is to provide a combination of phosphor materials which have the above mentioned qualities, and in addition produce white light, as well as the major colors of the spectrum, when their light outputs are combined in various proportions.

A further object of the invention is to provide an improved three color kinescope requiring no color filter in order to obtain a satisfactory red emission color.

Figure 2:
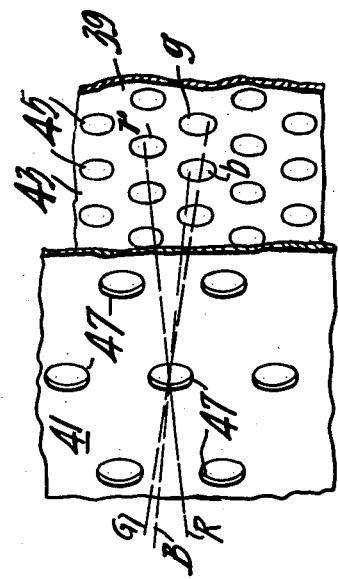
Figure 3:
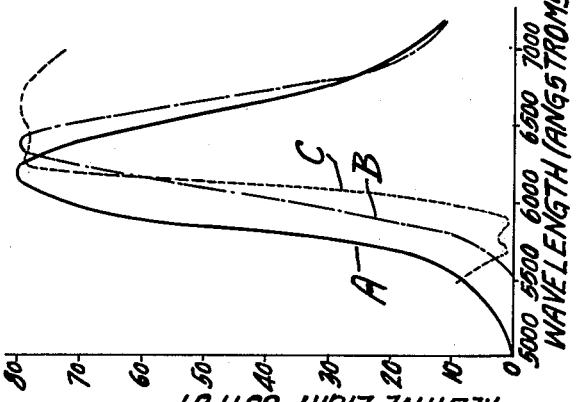

These and other objects will be more apparent and the invention will be more readily understood from the following detailed description and the accompanying drawings wherein:

Figure 1 is a view in section of a tri-color kinescope embodying the invention,

Figure 2 is a fragmentary exploded view of a portion of the shadow mask and phosphor-bearing viewing screen of the tube of Figure 1, and Figure 3 is a graph showing a comparison of the emission curves of a cadmium borate phosphor with manganese activator and a zinc orthophosphate phosphor with manganese activator, and the transmisison curve of a didymium glass filter, Corning No. 5920, all curves being normalized to equal efficiencies and transmission.

In general, one aspect of the present invention comprises a tri-color phosphor viewing screen including a red-emitting material which may be either one of two manganese-activated zinc orthophosphates having peak emissions at about 6380 A. The red-emitting material may also be a mixture of these two phosphors. The distinguishing characteristics of these phosphors will be more particularly set forth below. The preparation and properties of one of them are described in a copending application of Arthur L. J. Smith, Serial No. 202,734, filed December 26, 1950. The preparation and properties of the other are described in another copending application, Serial No. 202,735, filed December 26, 1950, and now Patent No. 2,697,077.

The screen also includes a blue-emitting phosphor which may comprise either a calcium magnesium silicate with titanium activator or a zinc sulfide with silver activator, and a green-emitting phosphor which preferably comprises a zinc orthosilicate with manganese activator.

As stated in the above referred to copending application, Serial No. 202,734, it was found that zinc orthophosphate phosphor may exist in at least three distinct crystalline forms. These three forms may be distinguished by such things as methods of preparation, emission characteristics, and X-ray diffraction spectra. One of the materials found useful for the screens of the present invention may be made by firing zinc orthophosphate with 1–10 mol percent of a manganese salt at a temperature of at least 800° C. Firing time should be at least 15 minutes and may be 2 hours or longer. Preferably, the firing temperature is between about 900° C. and 1060° C.

When a film of the above described phosphor is exposed in a General Electric XRD diffraction unit with copper target tube and nickel filter, it gives an X-ray diffraction pattern of which the strongest lines are given in the table below.

| dA.: | Relative intensity |
|---|---|
| 4.2 | .30 |
| 3.9 | .80 |
| 3.65 | .30 |
| 3.3 | 1.00 |
| 3.1 | 1.00 |
| 2.85 | 1.00 |
| 2.55 | .45 |
| 2.48 | .45 |
| 2.38 | .50 |
| 2.08 | .65 |
| 1.86 | .65 |
| 1.70 | .50 |
| 1.67 | .50 |
| 1.64 | .50 |
| 1.56 | .40 |
| 1.50 | .40 |

It is also possible to use another red-emitting form of the zinc phosphate phosphor as the red-emitting component of the present screens. The preparation of this material is described and claimed in another copending application of A. L. J. Smith, Serial No. 202,735, filed December 26, 1950. It may be prepared by firing a mixture of zinc orthophosphate with 0.1 to 10 mol percent of a manganese salt, and either 2 to 30 mol percent of a magnesium salt or about 5 to 20 mol percent of a pyrophosphate at temperatures of about 850°–1060° C. This phosphor exhibits an X-ray diffraction pattern of which the principal lines, and their relative intensities, are as follows:

| dA.: | Relative intensity |
|---|---|
| 4.35 | 1.00 |
| 4.0 | .45 |
| 3.4 | 1.00 |
| 2.5 | .80 |
| 2.43 | .45 |
| 2.38 | .45 |
| 2.10 | .65 |
| 2.02 | .40 |
| 1.76 | .40 |
| 1.65 | .55 |
| 1.54 | .60 |
| 1.442 | .45 |
| 1.320 | .35 |

Either one of the two above described red-emitting phosphors may be used or any mixture of the two.

The green-emitting phosphor component in the viewing screen of the present invention is preferably rhombohedral zinc silicate with 0.1 to 1.0% by weight manganese activator. The orthosilicate is preferred. Although percentages of manganese higher than 1% may be used, such materials have decreased efficiency compared with materials in which 0.1 to 1% activator is present.

The blue-emitting phosphors which are preferably used in viewing screens which are a part of the present invention comprise either calcium magnesium silicate having the formula $CaO \cdot MgO \cdot 2SiO_2$, with about 1–10 mol percent titanium dioxide activator, or zinc sulfide with silver activator. The zinc sulfide phosphor preferably contains about 0.001 to 0.025% by weight silver activator. The preparation of the silicate phosphor is described in U. S. Patent 2,589,513 of A. L. J. Smith.

The three phosphor materials described in the preceding paragraphs are deposited upon a plate, which may be of glass if the phosphors are to be viewed by light transmitted through the face plate. The plate may be incorporated into a cathode ray tube with one or more electron guns having the necessary power supplies and deflection circuits to enable the phosphors to be scanned with one or more beams of electrons.

An example of the type of cathode ray tube in which the viewing screen of the present invention may be used is diagrammatically illustrated in Figure 1. This tube comprises an evacuated envelope 11 having a glass neck 13, a metal cone 15, and a glass face plate 17.

The neck 13 contains three electron guns 19, 21, 23 disposed symmetrically about the longitudinal axis. The electron beams from these guns pass through screen electrodes 25, 25', and 25" and are focused and accelerated by the focusing and accelerating electrodes 27, 27', 27" and 29, 29', 29". The three separate accelerating electrodes 29, 29', 29" feed into a common cylindrical electrode 31, which electrode, in combination with an electrically conductive coating 33 on the inside of the glass neck 13, forms a converging electron lens for the hitherto parallel beams from the guns 19, 21, 23. Around the outside of the neck 13 is a deflecting coil 35 which is used to cause the converging electron beams to scan an image raster on a target assembly within the metal cone 15.

The cone 15 contains a concentrically disposed magnetic shield 37 which serves to shield the scanning electron beams from stray magnetic fields.

The cathode ray tube is provided with a luminescent viewing screen 39 disposed at the wide extremity of the cone 15 and immediately behind the glass face plate 17. An apertured shadow mask 41 is disposed in parallel arrangement with and spaced a short distance from that side 43 of the viewing screen facing the electron guns. The mask 41 and viewing screen 39 are oriented within the tube in such a way that the electron beams from the guns 19, 21, 23 scan an image raster upon the viewing screen 39 through the shadow mask 41.

The construction of the viewing screen 39 and the shadow mask 41 are shown in more detail in Figure 2. As shown in the figure, the glass plate carries on its surface 43 facing the electron beams, a plurality of phosphor dots 45. These dots are arranged in triads of different color-emitting phosphors. Each triad includes a dot r which is composed of the red-emitting phosphor, a dot b which is composed of the blue-emitting phosphor and a dot g which is a green-emitting phosphor.

These dots may be placed on the viewing screen 39 by well known silk screen printing techniques as described, for example, in the article "Phosphor-screen application in color kinescopes," Proc. I. R. E., vol. 39, pp. 1230–1236, October 1951, by N. S. Freedman and K. M. McLaughlin. They may also be applied by other methods.

The shadow mask 41 has a single aperture 47 for each triad of phosphors on the screen 39. As shown in Figure 2 the electron beams R, B, G approaching an aperture 47 in the mask 41 and converging therein pass on to bombarded selected phosphor dots r, b, g on the screen 39. Thus the beam R, modulated with red information, bombards the red phosphor dot r, the beam B, modulated with blue information, bombards the blue phosphor dot b, and the beam G, modulated with green information, bombards the green phosphor dot g.

There may be over 200,000 separate triads of dots on the target 39. Thus, with each triad representing a visual element in color, a full colored image of the televised scene is reproduced. Although the invention has been described with reference to a viewing screen composed of phosphor dots, it also includes screens with phosphor elements having other geometrical configurations such as lines. The techniques of applying these other phosphor elements are, in general, the same as those used for applying dots. The invention can also be utilized in color television receiving systems of the type wherein a filter disc rotates in front of a white light-emitting screen to produce an image in color. In this type of equipment it is necessary that the white-light producing phosphor contain red, blue and green components in order that these individual colors as well as black and white may be reproduced. This invention contemplates the use of the combination of red-, green-, and blue-emitting phosphors previously described to make up the white-emitting composition.

The improvement in light emission characteristics of the screens of the present invention, as compared to previous screens using cadmium borate phosphors, is illustrated by the curves of Figure 3. The curves of this figure have been normalized to equal efficiencies and transmission for purposes of comparison. Curve A is a typical emission curve of a cadmium borate phosphor activated with manganese. It will be noted that the peak emission of this phosphor is at 6200 A. and that much of its emission is at wavelengths below 6000 A. Without a color filter its emission is orange rather than red. In order to obtain a more desirable red emission in a tri-color kinescope, it is necessary to use a color filter, before the face of the tube, such as Corning No. 5920, a didymium glass composition. The transmission curve of this glass is shown as Curve C on Figure 3. Since this glass does not transmit much light below 6200 A, only the deeper red emission of the cadmium borate phosphor is transmitted to the eye of the viewer. However, as the curves also show, much of the light emitted by the phosphor is lost for all practical purposes.

Curve B of Figure 3 is a typical emission curve of a preferred form of zinc phosphate phosphor used in the screens of the present invention. This form is the one described in copending application Serial No. 202,734. Peak emission of this phosphor is at 6380 A. and its emission color, to the unaided eye, is as good a red as is obtained by using the filter with the borate phosphor. Since no filter is required, substantially all of the emitted light is seen by the viewer. The effective efficiency is therefore considerably higher than that of the borate phosphor with a filter.

Another improvement in the screens of the present invention is that the intensity of luminescence of the zinc phosphate phosphor component increases linearly with increase in beam current within the ranges of normal tube operation and within the ranges suitable for use with the blue and green components used. This was not true for the cadmium borate phosphor.

It has also been found that light output equal to that previously obtained from viewing screens which included the borate phosphor can be obtained with the present screens with decreased beam current. Thus, in general, decreased beam currents can be used for all three phosphors and there is much less danger of warping of the shadow mask.

What I claim as my invention:

1. A viewing screen comprising a base plate having disposed on a surface thereof a multiplicity of groups of discrete phosphor elements, each of said groups consisting of a red-emitting element of which the phosphor is a red-emitting zinc orthophosphate with manganese activator, a blue-emitting element of which the phosphor is selected from the class consisting of calcium magnesium silicate with titanium activator and zinc sulfide with about 0.001 to 0.025% by weight silver activator, and a green-emitting element of which the phosphor is zinc silicate with manganese activator.

2. A screen according to claim 1 in which said base plate is composed of transparent glass.

3. A luminescent viewing screen comprising a base plate having disposed on at least one surface thereof a multiplicity of regularly spaced discrete elements each of which consists essentially of a phosphor capable of emitting in one of three different colors when bombarded with cathode rays, a first one of said phosphors being a red-emitting zinc orthophosphate with manganese activator, a second one of said phosphors being selected from the class consisting of calcium magnesium silicate with titanium activator and zinc sulfide with about 0.001 to 0.025% by weight silver activator, and a third one of said phosphors being zinc silicate with manganese activator.

4. A screen according to claim 3 in which each of said different phosphors occurs in a pre-determined order of cyclic succession.

5. A screen according to claim 4 in which said second phosphor is calcium magnesium silicate activated with about 1–10 mol percent titanium.

6. A viewing screen comprising a base plate having disposed on a surface thereof a coating comprising a red-emitting zinc orthophosphate phosphor with manganese activator, a blue-emitting phosphor selected from the class consisting of calcium magnesium silicate with titanium activator and zinc sulfide with about 0.001 to 0.025% by weight silver activator, and a green-emitting zinc silicate phosphor with manganese activator.

7. In a multi-color kinescope, a luminescent viewing screen comprising a base plate having on a surface thereof a multiplicity of discrete phosphor elements at least some of which are composed of a red-emitting zinc orthophosphate phosphor with manganese activator and the remainder of the elements composed of phosphors emitting light in other regions of the visible spectrum.

8. In a multi-color kinescope, a luminescent viewing screen comprising a base plate having disposed on a surface thereof a multiplicity of groups of discrete phosphor elements, each of said groups consisting of a red-emitting element of which the phosphor is a red-emitting zinc phosphate phosphor with manganese activator, a blue-emitting element of which the phosphor is selected from the class consisting of calcium magnesium silicate with titanium activator and zinc sulfide with about 0.001 to 0.025% by weight silver activator, and a green-emitting element of which the phosphor is zinc silicate with manganese activator.

9. In a color television kinescope, a luminescent viewing screen comprising a base plate having on a surface thereof a phosphor composition capable of emitting white light under cathode ray excitation, said composition including a red-emitting zinc orthophosphate phosphor with manganese activator and luminescent means for producing images of light from other regions of the spectrum.

10. In a multi-color kinescope, a luminescent viewing screen comprising a glass base plate having disposed on a surface thereof a multiplicity of regularly spaced discrete elements each of which consists essentially of a phosphor capable of emitting in one of three different colors when bombarded with cathode rays, one of said phosphors being a red-emitting zinc orthophosphate with manganese activator and each of said different phosphors occurring in a predetermined order of cyclic succession.

11. Luminescent means for a color television picture reproducer comprising discrete areas of different phosphors, each phosphor capable of emitting light in one of three different colors when excited with cathode rays, the first of said phosphors consisting of red-emitting zinc orthophosphate with manganese activator, the second of said phosphors selected from the class consisting of calcium magnesium silicate with titanium activator and zinc sulphide with about 0.001 to 0.025% by weight of silver activator and the third of said phosphors being zinc silicate with manganese activator.

12. In a multi-color kinescope, a luminescent viewing screen comprising a base plate having disposed on the surface thereof luminescent means which consists essentially of phosphors capable of emitting light in one of three different colors when excited with cathode rays, one of said phosphors being a red-emitting zinc orthophosphate with manganese activator.

References Cited in the file of this patent

UNITED STATES PATENTS

| | | |
|---|---|---|
| 2,577,368 | Schultz et al. | Dec. 4, 1951 |
| 2,605,434 | Homrighous | July 29, 1952 |

FOREIGN PATENTS

| | | |
|---|---|---|
| 866,065 | France | Mar. 31, 1941 |

OTHER REFERENCES

Article by Henderson: Proceedings of the Royal Society of London, Series A–173, page 332, 1939.